United States Patent
Klaedtke et al.

(10) Patent No.: US 10,659,389 B2
(45) Date of Patent: May 19, 2020

(54) EFFICIENT CASCADING OF FLOW TABLES IN SOFTWARE DEFINED NETWORKS (SDN)

(71) Applicant: NEC Europe Ltd., Heidelberg (DE)

(72) Inventors: Felix Klaedtke, Heidelberg (DE); Ghassan Karame, Heidelberg (DE); Roberto Bifulco, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 342 days.

(21) Appl. No.: 15/325,721

(22) PCT Filed: Jul. 16, 2014

(86) PCT No.: PCT/EP2014/065275
§ 371 (c)(1),
(2) Date: Jan. 12, 2017

(87) PCT Pub. No.: WO2016/008524
PCT Pub. Date: Jan. 21, 2016

(65) Prior Publication Data
US 2017/0142026 A1 May 18, 2017

(51) Int. Cl.
*H04L 12/927* (2013.01)
*H04L 12/24* (2006.01)
(Continued)

(52) U.S. Cl.
CPC ........ *H04L 47/803* (2013.01); *H04L 41/0803* (2013.01); *H04L 41/0866* (2013.01);
(Continued)

(58) Field of Classification Search
CPC ............... H04L 41/0803; H04L 47/803; H04L 41/0866; H04L 47/41; H04L 67/34; H04L 45/021; H04L 45/38
(Continued)

(56) References Cited

U.S. PATENT DOCUMENTS 5,386,557 A * 1/1995 Boykin ............... G06F 16/2365
9,450,817 B1 * 9/2016 Bahadur ................. H04L 45/64
(Continued)

OTHER PUBLICATIONS

Andrew D Ferguson et al et al: "Hierarchical policies for software defined networks", Hot Topics in Software Defined Networks, ACM, 2 Penn Plaza, Suite 701 New Yaork NY 10121-0701 USA, Aug. 13, 2012 (Aug. 13, 2012), pp. 37-42, XP058008061.
(Continued)

*Primary Examiner* — Thomas J Dailey
*Assistant Examiner* — Lam H Duong
(74) *Attorney, Agent, or Firm* — Leydig, Voit & Mayer, Ltd.

(57) ABSTRACT

A method of providing access control for a software defined network (SDN) controller includes establishing a cascaded flow of flow table entries by linking together flow table entries of flow tables that are installed at network resources and that apply to the same packets or network flows, analyzing the impact of configuration requests from one or more applications regarding the installation and/or removal of flow table entries on existing cascaded flows, and rejecting configuration requests if the installation and/or removal of flow table entries according to the configuration requests would destroy an existing cascaded flow. The SDN controller includes an interface for interacting with one or more applications that are installed to run at the control plane of the SDN atop the SDN controller.

15 Claims, 4 Drawing Sheets

(51) Int. Cl.
*H04L 12/891* (2013.01)
*H04L 29/08* (2006.01)
*H04L 12/755* (2013.01)
*H04L 12/721* (2013.01)

(52) U.S. Cl.
CPC .............. *H04L 47/41* (2013.01); *H04L 67/34* (2013.01); *H04L 45/021* (2013.01); *H04L 45/38* (2013.01)

(58) Field of Classification Search
USPC ........................................................ 709/225
See application file for complete search history.

(56) References Cited

U.S. PATENT DOCUMENTS

| | | | | |
|---|---|---|---|---|
| 2003/0231590 | A1* | 12/2003 | Zhao | H04L 12/5602 370/230.1 |
| 2014/0075498 | A1* | 3/2014 | Porras | H04L 63/107 726/1 |
| 2014/0331280 | A1* | 11/2014 | Porras | H04L 63/20 726/1 |
| 2016/0006663 | A1* | 1/2016 | Zhang | H04L 47/33 709/234 |

OTHER PUBLICATIONS

"OpenFlow Switch Specification v1.4.0.", Oct. 14, 2013 (Oct. 14, 2013), XP055111101.
Paul Goransson et al: "How SDN Works" in: "Software Defined Networks", Jun. 30, 2014 (Jun. 30, 2014), Elsevier, XP055147402.

\* cited by examiner

EFFICIENT CASCADING OF FLOW TABLES IN SOFTWARE DEFINED NETWORKS (SDN)

CROSS REFERENCE TO RELATED APPLICATIONS

This application is a U.S. National Stage Application under 35 U.S.C. § 371 of International Application No. PCT/EP2014/065275 filed on Jul. 16, 2014. The International Application was published in English on Jan. 21, 2016 as WO 2016/008524 A1 under PCT Article 21(2).

FIELD

The present invention relates to a method of providing access control for a software defined network (SDN) controller. Furthermore, the present invention relates to a software defined network (SDN) with access control.

BACKGROUND

Managing and controlling network traffic is undergoing a major change, which manifests itself in software defined networking (SDN). At the core of SDN is the separation between the network's data plane and its control plane. At the data plane, network packets are physically shipped from one network component to the next until they reach their destination. The control plane comprises a logically centralized software entity—the SDN controller—running on commodity hardware. Today's controllers like NOX (see, for reference, N. Gude et al.: "NOX: Towards an operating system for networks," ACM SIGCOMM Computer Communication Review, 38(3):105-110, 2008) and Beacon (see, for reference, D. Erickson: "The Beacon OpenFlow controller," in Workshop on Hot Topics in Software Defined Networking (HotSDN), 2013) provide an abstract view on the network and an interface based on the programming model defined by the OpenFlow standard (see, for reference, OpenFlow switch specification—version 1.0.0. Open Networking Foundation, 2009). OpenFlow provides the means to program the network resources, i.e. essentially switches, which the controller uses to interact with the data plane. Network applications, e.g., for managing and analyzing the network, run on top of the controller.

Sharing network resources with user groups, divisions, or even other companies in software defined networking (SDN) is recently gaining increasing attention, owing to its promises for better network utilization. Resource sharing is effectively realized in SDN by empowering the involved parties at the control plane with permissions for administrating network components or parts thereof. Different tenants can lease a network slice (and therefore share the network resources) by installing and running their own application atop the network owner's controller using a so-called north-bound API (Advanced Programming Interface). These different tenants usually share network resources and at the same time might also compete among each other.

In this case, restricting the access of the network users (i.e., the network owner and the leasing tenants) and the applications to the network components emerges as a necessity to ensure the correct operation of the SDN network. While some existing proposals (for instance R. Sherwood et al.: "Can the production network be the testbed?," in Symposium on Operating Systems Design and Implementation (OSDI), 2010, or P. Porras et al.: "A security enforcement kernel for OpenFlow networks," in Workshop on Hot Topics in Software Defined Networks (HotSDN), 2012) include best-effort mechanisms for restricting the access to the network resources, these mechanisms are limited in their scope, do not scale with the number of applications, and it is not clear what kind of access control policies can be realized by them.

SUMMARY

In an embodiment, the present invention provides a method of providing access control for a software defined network (SDN) controller, the SDN controller comprising an interface for interacting with one or more applications that are installed to run at the control plane of the SDN atop the SDN controller, and wherein the SDN controller is configured to program flow tables of network resources at the data plane of the SDN in accordance with configuration requests from the one or more applications. The method includes establishing a cascaded flow of flow table entries by linking together flow table entries of flow tables that are installed at the network resources and that apply to the same packets or network flows, analyzing an impact of configuration requests from the one or more applications regarding the installation and/or removal of flow table entries on existing cascaded flows, and rejecting the configuration requests if the installation and/or removal of flow table entries would destroy an existing cascaded flow.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
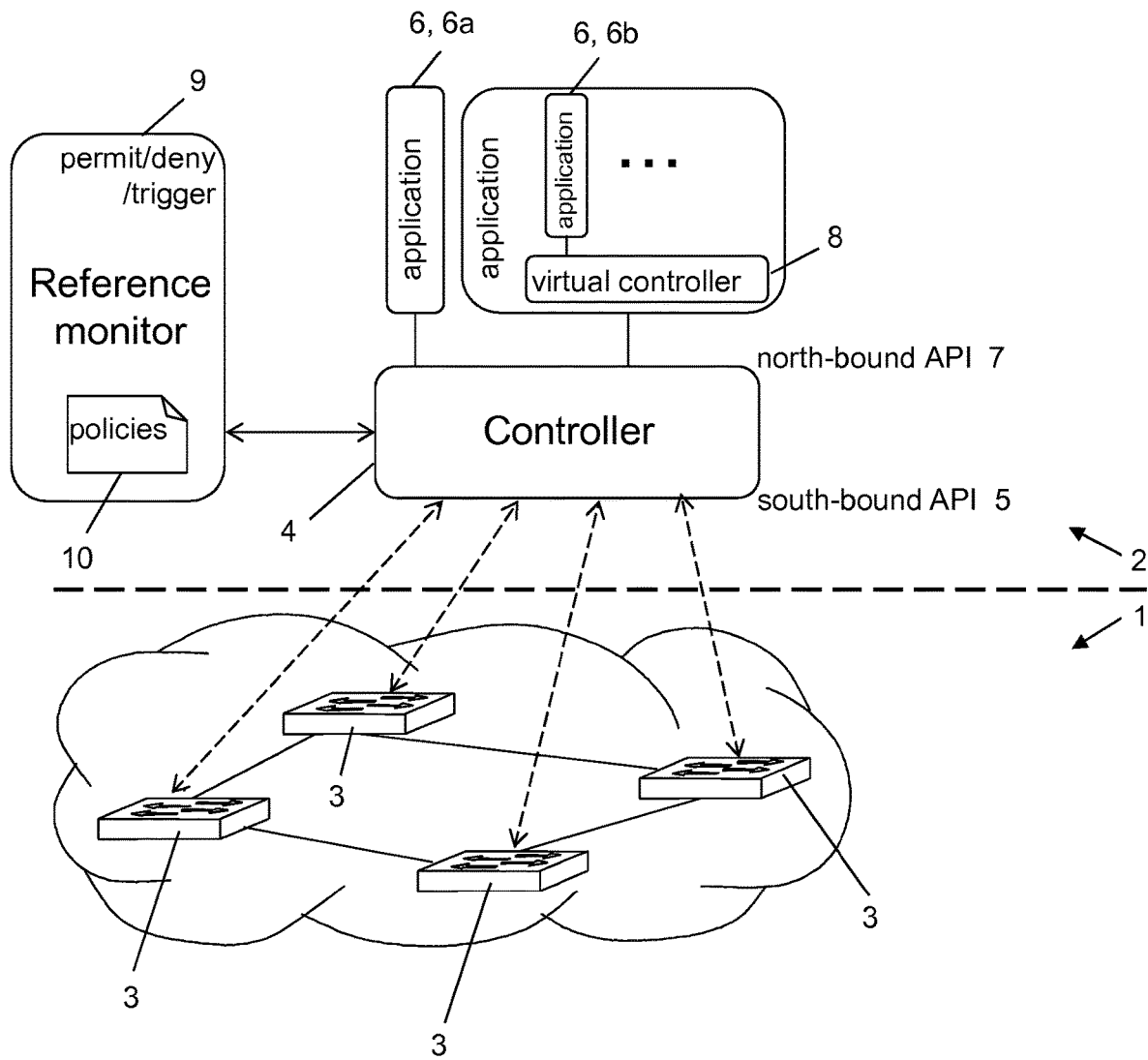
FIG. 1 is a schematic view illustrating an SDN controller architecture enhanced by an access control mechanism in accordance with an embodiment of the present invention.

Methods of providing access control for a software defined network (SDN) controller and a software defined network (SDN) with access control are provided by the present invention in such a way that the access to the SDN controller is restricted in an efficient and flexible way, thereby ensuring correct operation of the SDN network and securing it.

A method is described herein that is characterized by the steps of establishing a cascaded flow of flow table entries by linking together flow table entries of flow tables that are installed at said network resources and that apply to the same packets or network flows, analyzing the impact of configuration requests from said one or more applications regarding the installation and/or removal of flow table entries on existing cascaded flows, and rejecting configuration requests in case the according installation and/or removal of flow table entries would destroy an existing cascaded flow.

A network is described herein that is characterized in that that said controller and/or an associated entity is/are configured to establish a cascaded flow of flow table entries by linking together flow table entries of flow tables that are installed at said network resources and that apply to the same packets or network flows, to analyze the impact of configuration requests from said one or more applications regarding the installation and/or removal of flow table entries on existing cascaded flows, and to reject configuration requests in case the according installation and/or removal of flow table entries would destroy an existing cascaded flow.

According to an embodiment of the invention it has first been recognized that the handling of packets or network flows that require the installation of multiple entries in the flow tables of different switches, such that these entries constitute a cascaded flow, might be problematic in terms of network configuration consistency. The installation or the removal of a flow table entry might destroy such cascaded flows and can result in inconsistent network configurations. For instance, the installation of a flow table entry might interfere with an already installed flow table entry that is part of a cascaded flow as the new entry has a higher priority than the already installed one. Removing a flow table entry that is part of a cascaded flow can also result in an inconsistent network configuration. According to the present invention the controller is enabled to efficiently detect and discard such reconfigurations of the network components' (e.g. switches') flow tables.

In accordance with embodiments of the present invention such flow table entries are linked together such that these entries constitute a single entity. Any modification in the flow tables of network resources, which have an impact on this single entity, such that the installation and/or removal of a flow table entry would destroy an existing cascaded flow, are prohibited and are therefore rejected. By implementing efficient cascading of flow rules within flow table entries, the controller is provided with efficient means to modify/delete all related flow rules on-the-fly, without the need of further processing.

The access control scheme according to an embodiment of the present invention that enables a logically centralized network controller to administrate, with minimum overhead, network resources like switches, is low-level in the sense that it is close to the south-bound API of the controller, which interfaces directly with network resources, e.g. using OpenFlow. In other words, the approach of certain embodiments of the invention is to control access to the network resources at the control plane but as close as possible to the data plane. By doing so, the proposed access control scheme has a complete view over the data plane, which simplifies policy enforcement with conflict resolution. The advantages of this design choice are that (a) the OpenFlow standard is already well established and (b) other network abstractions are not yet that well understood or defined. In fact, it is to be expected that future north-bound APIs in SDN will support multiple different abstractions of the network at the control plane. Furthermore, any such interface will be built on top of the interface provided by OpenFlow that directly interacts with the network components. Therefore, since conflicts are easier to detect and resolve close to the south-bound interface, access control at higher layers will likely benefit from the present access control scheme and complement it.

According to a preferred embodiment the flow table entries may be linked together to form a cascaded flow by annotating installed flow table entries with additional fields that specify a flow table entry's predecessors and successors. In this regard it may be provided that a flow table entry's predecessors and successors in a cascaded flow are represented as pointers. By this means all parts of a cascade flow are quickly accessible by following the respective pointers.

In order to enable reliable application of the pointers it may be provided that each installed flow table entry is assigned an identifier. Also, the cascaded flows themselves may be assigned an identifier.

In order to handle configuration requests from applications properly, it may be provided that the controller keeps or stores updated tables of installed flow table entries together with the corresponding identifiers and additional fields that indicate the linking of the entries to their predecessors and successors of cascaded flows, e.g. in form of pointers. On the other hand, the network resources/components, e.g. switches, only need to store the flow table entries in their flow tables without any additional information.

According to a preferred embodiment of the controller comprises a reference monitor, which may be in charge of policy enforcement, and which is configured to check, prior to the installation of a flow table entry, whether an already installed flow table entry that is part of a cascaded flow would be overwritten by the installation. It should be noted that the network resources at the data plane do not have to be aware of these processes.

Advantageously, in order to avoid conflicts in connection with the removal of flow table entries, it may be provided that an installed flow table entry is only removed from the controller's flow table in case the installed flow table entry is not part of any cascaded flow. In case of the removal of a flow table entry, in order to ensure network consistency, it may be provided that the controller informs the involved network components accordingly, e.g. by sending a message to the corresponding network component to also remove the flow table entry from the network component's flow table. Similarly, in order to avoid conflicts in connection with the removal of an entire cascaded flow, it may be provided that an existing cascaded flow is removed from the controller's flow table by removing, for each part of the cascaded flow, the predecessor and successor pointers for the cascaded flow.

According to embodiments of the invention users may be empowered to install and run their own applications at the control plane atop said controller. For instance, the SDN controller may comprise a north-bound API (Advanced Programming Interface) that is configured to be employed by users for installing and running their applications. Since a common north-bound API and the resulting deployment of various third-party applications poses new security threats in SDN (indeed, "malicious" applications can leverage such API and infiltrate the SDN network), the access control scheme according to the present invention proves to be particularly useful in these cases.

According to a preferred embodiment, in order to handle conflicts efficiently, the installation or subscription of an application may also include the specification of reactions of that application. Preferably, the controller may comprise a reference monitor that is configured to pre-compute conflicts that can originate from multiple replies of controller applications that affect a single cascaded flow. This computation may be executed each time a new application is being subscribed or installed at the controller.

FIG. 1 schematically illustrates a network architecture that deploys SDN technology, which is enhanced by an access control mechanism in accordance with an embodiment of the present invention. As can be obtained from FIG. 1, SDN involves the separation between the network's data plane 1 and its control plane 2. At the data plane 1, network resources, in particular switches 3, forward packets from one network component to the next until the packets reach their destination. At the control plane 2, a logically centralized software entity, i.e. SDN controller 4, having an abstract view on the network interfaces directly (for instance, via south-bound API 5) with the network resources, in particular for programming the switches' 3 flow tables, e.g. by using OpenFlow.

Network applications 6, e.g., for managing and analyzing the network, run atop of the controller 4. However, existing controllers do not expose a common interface for applications and applications need therefore to be redeveloped for different controllers. To overcome this limitation, organizations—such as the Open Networking Foundation (ONF)—started defining and standardizing a north-bound API, i.e., an interface provided by a controller for interacting with applications (see, for reference, S. Raza and D. Lenrow. North bound interface working group charter. Open Networking Foundation, 2013. www.opennetworking.org/images/stories/downloads/working-groups/charter-nbi.pdf). The reliance on a north-bound API is expected to shape the large-scale deployment of SDN, where multiple (third-party) applications interface with the same controller, providing better resource utilization and management.

As can be obtained from FIG. 1, in the illustrated embodiment the controller 4 comprises a north-bound API 7 for interacting with applications 6 either directly (like with application 6a) or via a virtual controller 8 (like with applications 6b). In either case, a common north-bound API 7 poses several threats in SDN. These threats become particularly evident when network resources are shared with user groups, divisions or even other companies. Resource sharing is effectively realized by empowering these parties at the control plane 2 with permissions for administrating network components or parts thereof, i.e. the network owner "leases" network slices, which are administrated by the leasing tenants by installing their own, possibly third-party, applications atop of the network owner's SDN controller 4. However, since the network resources at the data plane 1 are shared and the different parties can have competing objectives, conflicts between the users may arise, e.g., about the network components' configurations. For instance, when users (i.e., network administrators) subscribe applications 6 that are triggered by messages sent from a switch 3 to the controller 4 (e.g., a packet-in event is sent by a switch 3 to the controller 4 when the switch 3 receives a packet that does not match any of the entries in its flow table), such messages can trigger multiple applications 6 and each of the applications 6 can react to this message differently.

In the sequel, the rules that are installed by the controller 4 (e.g., via OpenFlow messages, indicated in FIG. 1 by the dashed line arrows) in the switches' 3 flow tables are denoted by flow table entries. Each such entry consists of a match set that determines to which packets the rule applies, an action set that defines how matching packets are processed, a priority field, and possibly hard or idle timeout values. Switches 3 can also send messages to the controller 4. For instance, a switch 3 can be configured to send a 'packet-in' message to the controller 4 whenever it receives a packet that has no matching flow table entry. The controller 4 then triggers an application 6, running atop of the controller 4, to react to this message.

In the context of the embodiment illustrated in FIG. 1 it is assumed that, as in most access control schemes, the entities of the access control scheme described in detail hereinafter are classified as subjects and objects. The subjects of the access control scheme are the entities that manipulate objects, namely, users. Usually there is a special subject, the network administrator, which has complete control over the controller 4. It is remarked that applications 6 are not subjects; they are executed on behalf of users (i.e., the subjects) and the user running an application 6 manipulates the objects. They have therefore the permissions of the users. For example, the same monitoring application can be executed by different users, with different permissions. The switches 3, the ports, the flow tables of the switches 3, and the flow table entries are objects of the scheme. Although ports and flow tables are components of the switches, they can be treated as separate logical entities, allowing to differentiate between the different ways to interact with switches 3.

An access control policy that assigns permissions to subjects to access objects (e.g. that specifies who can subscribe applications 6) is enforced by a reference monitor 9 which, in addition, also enforces several other access control policies 10, as will be described in detail below. In the following, the permissions are described that can be assigned to subjects, whereby restricting the actions they can perform. Actions consist of requests to objects and to the events triggered by the objects. For example, a subject can request to subscribe an application 6 to be triggered by a packet-in event (e.g., an OpenFlow message of type OFPT_PACKET_IN).

Instead of having a separate permission for each message type, it can be advantageous to take a more high-level approach and introduce only few permissions for accessing the objects, where several message types are grouped together. Another advantage is that policies 10 remain manageable since only few permissions are assigned to subjects. Furthermore, it is pointed out that the permissions not only restrict the communication between the control plane 2 and the data plane 1. They also concern, e.g., the information the controller 4 is allowed to provide to subjects.

Similar to read and write permissions in an operating system for accessing the content of files, permissions are defined for reading statistics, requesting information about the state of a switch 3 and modifying its state, and subscription permissions. These permissions are named stat, config_read, config_mod, and subscr permissions. For instance: (1) a subject who has the config_read permission for a flow table can obtain a list of all the entries of that flow table, and the config_read permission is necessary to read a flow table entry's match set or priority, (2) the config_mod permission allows a subject to change the switches' 3 configuration, and (3) the subscr permission for a port allows a subject to subscribe an application 6, which is then triggered whenever the status of the port changes. As will be easily appreciated by those skilled in the art, alternative and/or additional permissions may be defined and the set of permissions that is actually considered by the access control scheme may thus be altered accordingly.

A policy 10 lists the assigned permissions to the subjects. The policy 10 is centrally administered by the network administrator who assigns and revokes permissions by adding and deleting list entries. Policy enforcement is done at the control plane 2, close to the interface between the control plane 2 and the network components 3, by equipping the SDN controller 4 with a reference monitor 9. It is pointed out that the data plane 1 is not affected by such a controller extension, since the reference monitor 9 only filters out some messages or sanitizes them at the control plane 2 according to the given policy 10.

Before the controller 4 performs an action (e.g., sending a message to a switch 3 or subscribing an application 6 to packet-in messages), it invokes the reference monitor 9, which performs policy enforcement by checking whether the action complies with the given policies 10 and, consequently, permits or denies the actions. For example, before the controller 4 sends an OpenFlow message to a switch 3, the reference monitor 9 checks whether the subject has the permissions (e.g. stat, config_read, and config_write) for doing so. It is noted that the reference monitor 9 must be aware of the subject that wants to send the message.

Embodiments of the invention are based on the introduction of new objects which replace flow tables and flow table entries, and are not physical entities of the data plane 1. These new objects, termed hereinafter 'flow rules' and 'flow spaces', only exist on the control plane 2 and are managed by the controller 4. The new objects allow having more fine-grained access control on the network resources, as will be explained below.

Generally, a flow rule can be understood as an annotated flow table entry. Formally, allow rule (FR) may be constructed as a tuple (match, act, attr), where match is a set of packet headers against which incoming packets are matched, act is a finite set of actions that a switch 3 performs when this rule applies, and attr are the attributes of the FR. Attributes appearing in the current OpenFlow standard for flow table entries are an entry's priority, its timeout values, and whether a message must be sent to the controller 4 when the entry is removed from the flow table. Hereinafter, the terms flow rule and flow table entry are used interchangeably, assuming that each flow rule corresponds to exactly one flow table entry.

The introduction of the concept of 'flow spaces' in accordance with embodiments of the invention allow to hierarchically structuring flow tables. Applications can be attached to the flow spaces. This corresponds to subscribing an application to a trigger event. For instance, an attached application is triggered whenever there is a packet-in message for a packet that falls into the respective flow space. In the context of the conflict resolution scheme, a policy may be specified that makes trigger events relative to flow spaces.

Formally, allow space (FS) may be constructed as a tuple (heads, acts, attrs), where heads is a set of packet headers, acts is a set of actions, and attrs is a set of attributes of FRs. With attrs it is possible, e.g., to specify ranges of valid priorities and timeout values; only FRs with priorities in this range can be assigned to the FS. It is defined that an FR r=(match, act, attr) is valid for the FS S=(heads, acts, attrs) if match⊆heads, act⊆acts, and attr∈attrs. The FS S1 is a subspace of the FS S2 if S1's components are pointwise included in S2's corresponding components. The FSs S1 and S2 are overlapping if $heads_1 \cap heads_2 \neq \emptyset$, where $heads_1$ is the first component of $S_i$, for i∈{1, 2}.

Figure 2:
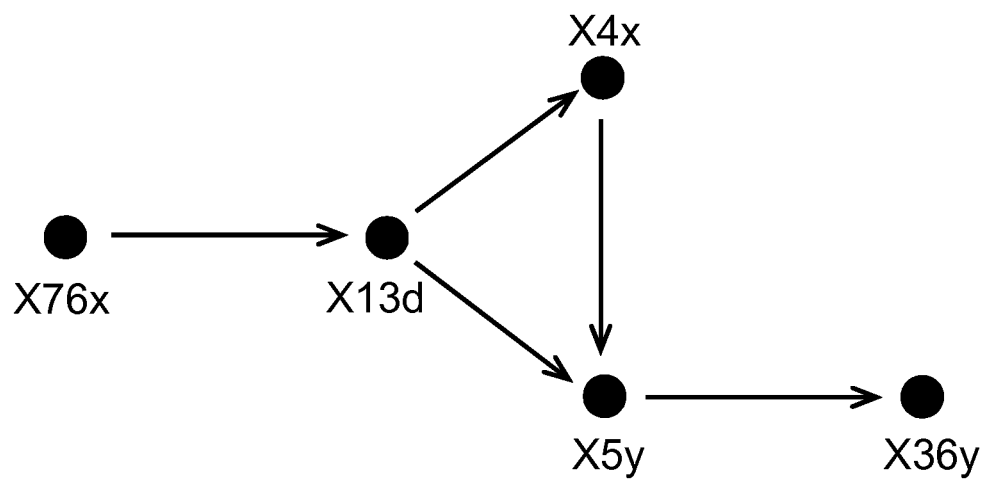
FIG. 2 is a schematic view illustrating the general concept of an embodiment of the present invention by way of an exemplary cascaded flow.

FIG. 2 illustrates the concept of cascaded flows that are considered to constitute a single entity in accordance with an embodiment of the present invention. Generally, the reference monitor 9 described in connection with FIG. 1 may provide means to link flow table entries stored in the flow tables of different switches 3 and to handle such cascaded flows as single entities.

The dots in FIG. 2 illustrate flow table entries in the flow tables of different switches 3 that are all related to the handling of the same packet or network flow. The flow table entries are annotated with individual identifiers. For instance, this annotation of flow table entries can be performed by the applications 6. A given policy of the access control scheme may assign permissions relative to flow spaces whether an application 6 can annotate flow table entries.

For instance, the flow table entry on the very left side of FIG. 2 is annotated with identifier X76x. This flow table entry causes the packet to which the flow table applies to be forwarded to a next switch 3 where the packet is further processed by a flow table entry annotated with identifier X13d. Hence, flow table entry X76x can be regarded as predecessor of flow table entry X13d and, vice versa, flow table entry X13d is successor of flow table entry X13d. This concept will be explained in detail in connection with FIG. 3. It is important to note that there can be multiple predecessors and successors since a flow table entry can be part of multiple cascaded flows. For instance, in the embodiment of FIG. 2 flow table entry identified as X5y has two predecessors: X13d and X4x. On the other hand it is possible that a flow table entry has no predecessor or no successor. For instance, in the embodiment of FIG. 2 flow table entry identified as X76x has no predecessor, and flow table entry identified as X36y has no successor.

Figure 3:
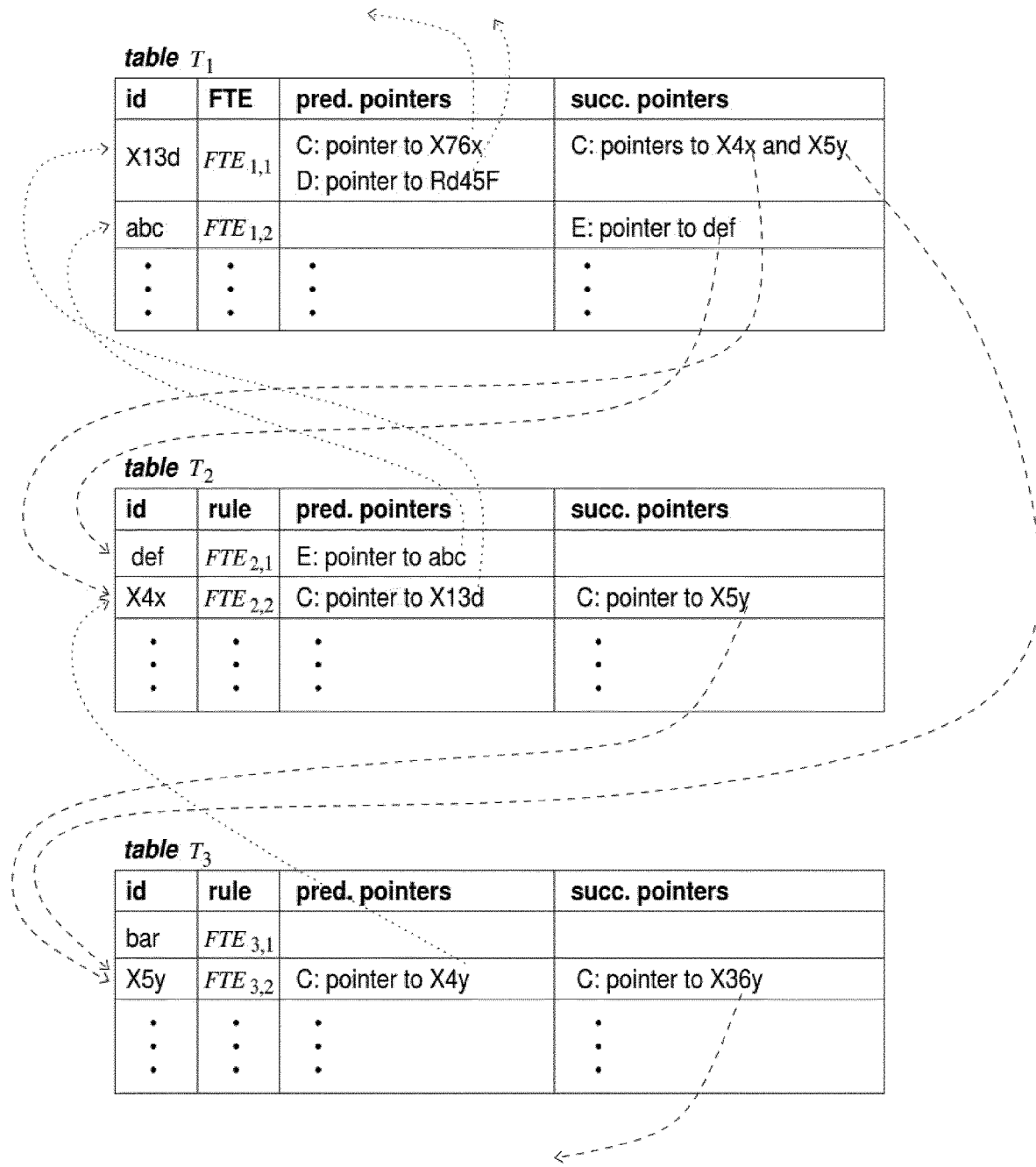
FIG. 3 is a schematic view illustrating a scheme of tables with flow table entries and pointers for handling cascaded flows in accordance with an embodiment of the present invention.

Turning now to FIG. 3, this figure illustrates the handling of cascaded flows by means of flow table entries and pointers. As already mentioned above, flow table entries and cascaded flows have identifiers. For instance, the cascaded flow described in connection with FIG. 2 is assigned identifier 'C' in FIG. 3. The links, i.e. predecessors and successors, of cascaded flows are represented as pointers whereby allowing one to handle cascaded flows efficiently, as will be described hereinafter.

The controller 4 stores the flow table entries (FTEs) in tables together with their identifiers and the additional fields, e.g. pointers, for linking the entries to their predecessors and successors of cascaded flows, as described already above in connection with FIG. 2. The tables correspond to the flow tables at the switches 3, i.e. the switches 3 only store the FTEs in their flow tables, and only the controller 4 stores the FTEs together with this additional information. In FIG. 3, the dotted line arrows indicate pointers to the respective predecessors of a flow table entry, while the dashed line arrows indicate pointers to the respective successors of a flow table entry.

According to a preferred embodiment, in addition to the OpenFlow attributes (priority, timeout values, etc.) for flow table entries, a new attribute, denoted cascade_flow may be considered, which relates a flow table entry to other objects and restricts its modifications. The attribute cascade_flow may relate flow table entries installed at different switches among each other. This is done by annotating the flow rule with a list of all related flow table entries. The attribute cascade_flow may stipulate that (i) the deletion of one of the related flow table entries causes the deletion of all of them and (ii) a packet processed by the first flow table entry must not be processed by any other flow table entry until the packet was processed by the last specified flow table entry.

In accordance with further embodiments of the present invention the operations for manipulation the tables may be implemented as follows:

FTE removal can be accomplished according to the following procedure: (i) If the FTE is not part of any cascaded flow, the FTE can be removed from the controller's 4 table (e.g. upon a respective (re-)configuration request from an application 6). In this case the controller 4 sends a message to the corresponding switch 3 to also remove the FTE from the flow table; (ii) On the other hand, if the FTE is part of one or more cascaded flows (i.e., the pointer lists of the rule are not empty), then the FTE removal is not permitted by the reference monitor 9.

Cascaded Flow Removal can be accomplished according to the following procedure. For each part of a cascaded flow, the controller 4 removes the predecessor and successor pointers for that cascaded flow. If both lists of pointers are empty, the controller 4 also removes the FTE from the table and sends a message to the corresponding switch 3 to also remove the FTE from the flow table. It should be noted that the parts of a cascaded flow are quickly accessible by following the respective pointers.

FTE installation can be accomplished according to the following procedure. The reference monitor 9 checks whether a new FTE (e.g. in accordance with a configuration request from an application 6) does not overwrite any FTE in the table that is part of a cascaded flow. Exceptions are FTEs that are only initial parts of a cascaded flow, which can be overwritten. The table is updated and the controller 4 also installs the FTE at the corresponding switch 3.

Cascaded flow installation can be accomplished according to the following procedure. The reference monitor 9 checks the following conditions:

(1) Conflict with a single FTE. Does an FTE (not part of a cascaded flow) overwrite an FTE (not the initial FTE) of the cascaded flow?

(2) Conflict with a cascaded flow. Do all FTEs of the cascaded flow always overwrite the FTEs of the already installed cascaded flows or are they all overwritten by the same cascaded flow? It is again noted that using the pointers it is possible to quickly access the FTEs of a cascaded flow.

If one of the above conditions is not fulfilled, the installation of the cascaded flow is not permitted. If both conditions are fulfilled, the controller 4 installs the new FTEs and updates the pointer lists of the already installed FTEs. It also installs the FTEs at the corresponding switches 3.

Figure 4:
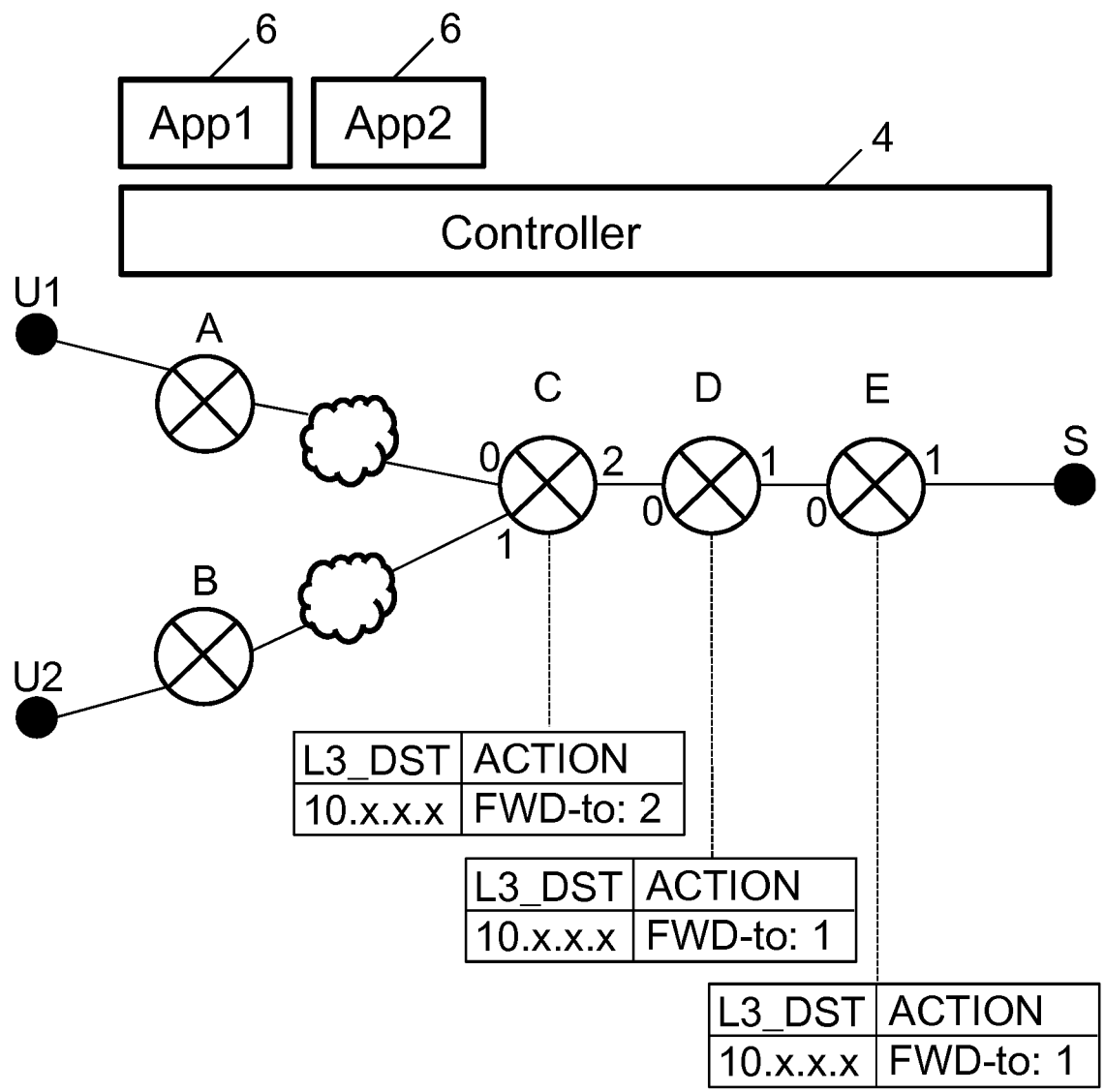
FIG. 4 is a schematic view illustrating the use of cascaded flows in accordance with an embodiment of the present invention.

In conformity with the SDN network architecture as described above in connection with FIG. 1, FIG. 4 illustrates an embodiment of the present invention that demonstrates the usefulness of annotating FTEs and considering cascaded flows. In the scenario considered in FIG. 4, it is assumed that the network is operated by a controller 4 that runs two separated applications 6, denoted App1 and App2. App1 is involved in the management of the traffic coming from the node U1, while App2 provides the same service for U2. Given the network topology represented in FIG. 4, and assuming that both U1 and U2 would like to send network packets to the node S, the final part of the path towards S is shared for both network flows.

It is assumed that App1 first installs a complete path for the S IP subnet (referred to as 10.x.x.x), i.e., it installs a cascaded flow with the respective FTEs at the switches A, C, D, and E. At some point App2 does the same for U2, i.e., it installs a cascaded flow from U2 to S. Since the FTEs in the switches C, D, and E are already installed for that destination, the controller 4 will not reinstall them. It only updates the respective pointers in its tables where it stores the FTEs together with the pointers of the cascaded flows.

If App1 or App2 (or any other application 6) would like to delete the FTEs in the tables C, D, or E belonging to one of the two cascaded flows, the cascade annotation makes sure that the reference monitor 9 (not illustrated in FIG. 4) denies their deletion and thus prevents the (partial) destruction of the cascaded flows. In fact, the entries in C, D, and E are only deleted if both App1 and App2 delete their cascaded flows from U1 to S and from U2 to S. Furthermore, the deletion of a cascaded flow, including all its FTEs that are not shared in any other cascaded flow, can be done efficiently by following the pointers. For example, if App2 deletes its cascaded flow first, only the FTE at switch B is deleted. The other FTEs at C, D, and E are not deleted since they are still used by the other cascaded flow. The reference monitor 9 inspects all these entries in linear time by following the respective pointers.

The proposed access control scheme is the first comprehensive one for SDN controllers for restricting the access of network applications to the network resources. Equipping SDN controllers with a reference monitor, capable of enforcing policies of the proposed scheme, reduces the attack surface of SDN networks, in particular, multi-tenant SDN networks. Thus, the access control scheme according to the present invention adds fundamental security concepts to SDN controllers, e.g. based on OpenFlow, which are essential for the development of mature SDN network operating system for multi-application/multi-tenant settings.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method of providing access control using a software defined network (SDN) controller at a control plane of the SDN, the SDN controller comprising an interface for interacting with one or more applications that are installed to run at the control plane of the SDN atop the SDN controller, and wherein the SDN controller is configured to program flow tables of network resources at a data plane of the SDN in accordance with configuration requests from the one or more applications, the method comprising:

establishing a cascaded flow of flow table entries by storing, at the SDN controller, linking information that links together flow table entries of flow tables that are installed at the network resources and that apply to the same packets or network flows, wherein the linking information includes installed flow table entries with pointer fields that specify predecessors and successors of a flow table entry, wherein a pointer field of at least one flow table entry specifies multiple predecessor flow table entries and/or multiple successor flow table entries, analyzing an impact of a configuration request from one of the one or more applications regarding the installation and/or removal of a flow table entry on existing cascaded flows, and rejecting the configuration request if the installation and/or removal of the flow table entry would destroy an existing cascaded flow.

2. The method according to claim 1, wherein each installed flow table entry is assigned an identifier.

3. The method according to claim 2, wherein the SDN controller keeps or stores updated tables of installed flow table entries together with the identifiers and the pointer fields.

4. The method according to claim 1, wherein the SDN controller comprises a reference monitor that is configured to check, prior to the installation of a flow table entry, whether an already installed flow table entry that is part of a cascaded flow would be overwritten by the installation.

5. The method according to claim 1, wherein an installed flow table entry is only removed from a table of the SDN controller if the flow table entry is not part of any cascaded flow.

6. The method according to claim 1, wherein, upon a flow table entry being removed from the table of the SDN controller, a message is sent to the corresponding network resource to also remove the flow table entry from a flow table of a corresponding network resource.

7. The method according to claim 1, wherein a complete cascaded flow is removed from a table of the SDN controller by removing, for each part of the cascaded flow, predecessor and successor pointers for the cascaded flow.

8. The method according to claim 1, wherein users are empowered to install and run their own applications at the control plane atop the SDN controller.

9. The method according to claim 1, wherein an installation of an application includes specification of reactions of the application.

10. A software defined network (SDN) controller configured to execute the method according to claim 1.

11. A software defined network (SDN) with access control, the SDN comprising:

a controller at a control plane of the SDN, the controller configured to:
  interact, via an interface, with one or more applications that are installed to run at the control plane of the SDN atop the controller, and
  program flow tables of network resources at a data plane of the SDN in accordance with configuration requests from the one or more applications,
wherein the controller and/or an associated entity is/are configured to:
  establish a cascaded flow of flow table entries by storing, at the controller, linking information that links together flow table entries of flow tables that are installed at the network resources and that apply to the same packets or network flows, wherein the linking information includes installed flow table entries with pointer fields that specify predecessors and successors of a flow table entry, wherein a pointer field of at least one flow table entry specifies multiple predecessor flow table entries and/or multiple successor flow table entries,
  analyze an impact of a configuration request from one of the one or more applications regarding the installation and/or removal of a flow table entry on existing cascaded flows, and
  reject the configuration request if the installation and/or removal of the flow table entry would destroy an existing cascaded flow.

12. A network according to claim 11, wherein the controller comprises a north-bound Advanced Programming Interface (API) that is configured to be employed by users for installing and running their own applications at the control plane atop the controller.

13. The network according to claim 11, wherein the associated entity is a reference monitor configured to interface with the controller.

14. The network according to claim 11, wherein a pointer field of at least one flow table entry specifies no predecessor flow table entries and/or no successor flow table entries.

15. The method according to claim 1, wherein a pointer field of at least one flow table entry specifies no predecessor flow table entries and/or no successor flow table entries.

* * * * *